T. NORRIS.
Lewis.
No. 211,253.   Patented Jan. 7, 1879.
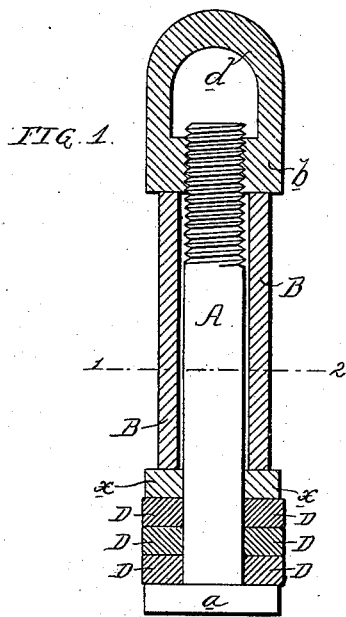
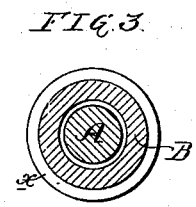
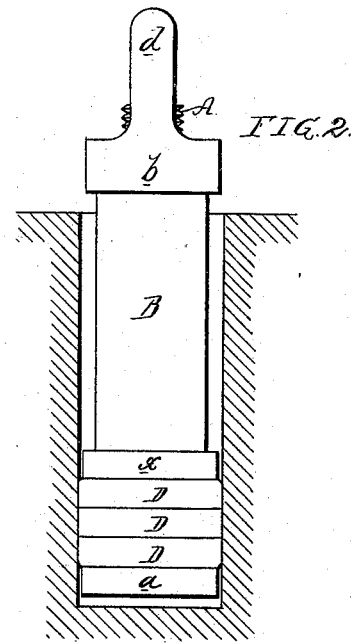
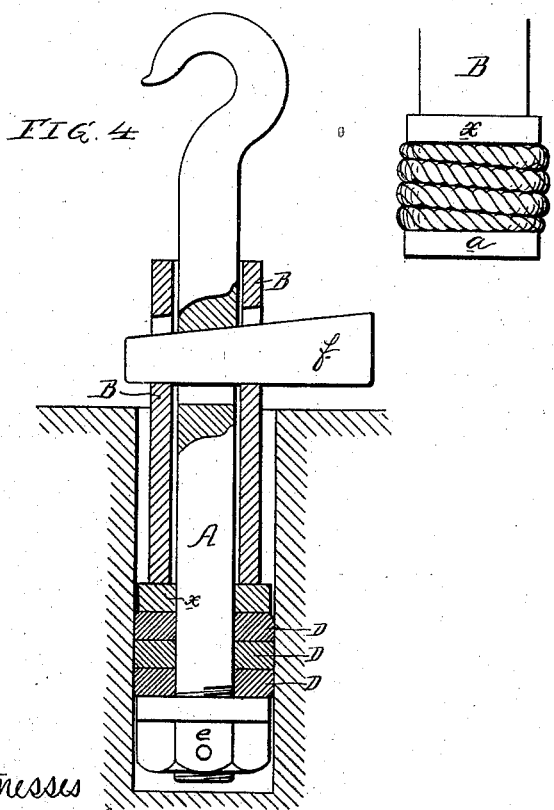
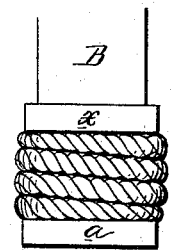
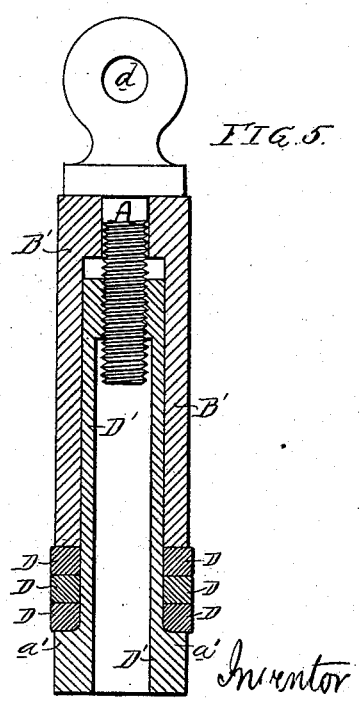
Witnesses
Henry Howson Jr.
Harry Smith
Inventor
Thaddeus Norris
by his Attorneys
Howson & Son

UNITED STATES PATENT OFFICE.

THADDEUS NORRIS, JR., OF PHILADELPHIA, PENNSYLVANIA.

IMPROVEMENT IN LEWISES.

Specification forming part of Letters Patent No. 211,253, dated January 7, 1879; application filed December 7, 1878.

*To all whom it may concern:*

Be it known that I, THADDEUS NORRIS, Jr., of Philadelphia, Pennsylvania, have invented a new and Improved Lewis, of which the following is a specification:

The main object of my invention is to make a lewis which can be used as a medium, in connection with suitable tackle, for raising and lowering stones without making in the latter the usual undercut recesses, a simple cylindrical recess drilled in the stone being all that is required to receive my improved lewis.

In the accompanying drawing, Figure 1 is a vertical section of my improved lewis; Fig. 2, an exterior view of the same as it appears when contained in the recess of a stone; Fig. 3, a sectional plan on the line 1 2; Figs. 4, 5, and 6, views representing modifications of my invention.

In Figs. 1 and 2, A is a bolt, provided at the lower end with a circular enlargement or head, $a$, and at the upper threaded end with a nut, $b$, having an eye, $d$, for receiving the hook of any hoisting-tackle. Between the head $a$ of the bolt and the nut $b$ intervenes a metal tube, B, a metal washer, $x$, and any desired number of rubber rings, D, (three in the present instance;) or a single ring of rubber may be used in some cases, and a number of metal rings or washers may be used in place of the metal tube B.

Instead of forming in the stone to be hoisted the undercut recess which an ordinary lewis demands, and which cannot be made without tedious manipulation, a simple circular recess is drilled in the stone H for the reception of my improved lewis, which is dropped into the said recess while the rubber rings are contracted, owing to the nut $b$ being loose. After the lewis has been thus deposited in the recess of the stone, as shown in Fig. 2, the nut $b$ is tightened, so as to compress the rubber rings and expand them against the sides of the recess until the lewis is so jammed therein that it becomes a secure medium through which the stone can be raised and lowered. When the nut is unscrewed and pressure thus removed from the rubber rings, the latter will contract, and the lewis will be at liberty to be withdrawn from the recess in which the tube B and head $a$ fit freely. Both, however, should be of such a diameter, in respect to the recess, that the projection beyond them of the rubber rings, when the latter are compressed, shall be as little as possible.

In the modification, Fig. 4, the bolt terminates at the top in a hook, and is secured at the bottom to a collar or nut, $e$, the compression of the rubber rings being effected by a wedge-shaped key, $f$, the operation of which will be readily understood without explanation.

In the modification, Fig. 5, the head of the bolt A is immediately below the eye $d$, and bears on the top of a tube, B', containing an inner tube, D', the upper portion of which constitutes the nut of the bolt. The rubber rings are confined between the flange $a'$ of the inner tube and the lower end of the outer tube.

Rings of rubber are not essential in carrying out my invention. A strip of rubber, for instance, may be coiled in the space between the head of the bolt and the washer $x$; or a coil of rope, as shown in Fig. 6, or leather may be used; or, indeed, any material which will yield under pressure, and can be expanded laterally thereby against the sides of the recess, may be employed, providing it will recoil so far on the removal of the pressure as to permit the lewis to be withdrawn from the recess.

I claim as my invention—

A lewis in which a bolt, constructed for attachment to hoisting-tackle, and a metal tube or ring, B, is combined with a rubber ring or rings, or the equivalent to the same, substantially as described.

In testimony whereof I have signed my name to this specification in the presence of two subscribing witnesses.

THADDEUS NORRIS, JR.

Witnesses:
ALEX. PATTERSON,
HARRY SMITH.